(12) United States Patent
Majumdar et al.

(10) Patent No.: US 10,474,949 B2
(45) Date of Patent: Nov. 12, 2019

(54) KNOWLEDGE-GRAPH BIASED CLASSIFICATION FOR DATA

(71) Applicant: QUALCOMM Incorporated, San Diego, CA (US)

(72) Inventors: Somdeb Majumdar, San Diego, CA (US); Regan Blythe Towal, San Diego, CA (US); Sachin Subhash Talathi, San Diego, CA (US); David Jonathan Julian, San Diego, CA (US); Venkata Sreekanta Reddy Annapureddy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 485 days.

(21) Appl. No.: 14/528,890

(22) Filed: Oct. 30, 2014

(65) Prior Publication Data

US 2016/0055409 A1    Feb. 25, 2016

Related U.S. Application Data

(60) Provisional application No. 62/039,329, filed on Aug. 19, 2014.

(51) Int. Cl.
*G06N 3/08* (2006.01)
*G06N 3/04* (2006.01)
*G06N 7/00* (2006.01)

(52) U.S. Cl.
CPC .............. *G06N 3/08* (2013.01); *G06N 3/04* (2013.01); *G06N 3/0427* (2013.01); *G06N 7/005* (2013.01); *G06N 3/049* (2013.01)

(58) Field of Classification Search
None
See application file for complete search history.

(56) References Cited

U.S. PATENT DOCUMENTS

| 8,472,706 | B2 | 6/2013 | Schneiderman |
| 8,705,795 | B2 | 4/2014 | Aoba |
| 8,732,025 | B2 | 5/2014 | Gokturk et al. |
| 2014/0010410 | A1 | 1/2014 | Sakurai |
| 2014/0201126 | A1 | 7/2014 | Zadeh et al. |
| 2015/0310862 | A1* | 10/2015 | Dauphin ............. G10L 15/1815 704/257 |

FOREIGN PATENT DOCUMENTS

| CN | 101187985 A | 5/2008 |
| JP | 2007164560 A | 6/2007 |

(Continued)

OTHER PUBLICATIONS

Baesens et al. "Bayesian neural network learning for repeat purchase modelling in direct marketing", EJOR, 2002, pp. 192-211.*
(Continued)

*Primary Examiner* — Li Wu Chang
(74) *Attorney, Agent, or Firm* — Seyfarth Shaw LLP

(57) ABSTRACT

A method for classifying an object includes applying multiple confidence values to multiple objects. The method also includes determining a metric based on the multiple confidence values. The method further includes determining a classification of a first object from the multiple objects based on a knowledge-graph when the metric is above a threshold.

15 Claims, 11 Drawing Sheets

(56) References Cited

FOREIGN PATENT DOCUMENTS

| JP | 2009048294 A | 3/2009 |
| TW | 200933394 A | 8/2009 |
| TW | 201331772 A | 8/2013 |

OTHER PUBLICATIONS

Bordes A., et al., "A Semantic Matching Energy Function for Learning with Multi-relational Data," Machine Learning, May 30, 2013 (May 30, 2013), vol. 94, No. 2, pp. 233-259, XP055235389, DOI: 10_1007/s10994-013-5363-6.

Farabet et al., "Learning Hierarchical Features for Scene Labeling," IEEE Transactions on Pattern Analysis and Machine Intelligence, Oct. 17, 2012 (Oct. 17, 2012), vol. 35, No. 8, pp. 1915-1929, XP011515324, DOI: 10.1109/TPAMI.2012.231 sections 1, 3 and 4.

International Search Report and Written Opinion—PCT/US2015/042488—ISA/EPO—dated Feb. 1, 2016.

Myeong H., et al., "Learning Object Relationships via Graph-based Context Model," Proceedings of the 2012 IEEE Conference on Computer Vision and Pattern Recognition (CVPR'12), Jun. 16, 2012 (Jun. 16, 2012), pp. 2727-2734, XP032208920, DOI: 10.1109/CVPR.2012.6247995.

Quek A., et al., "Structural Image Classification with Graph Neural Networks," Proceedings of the 2011 International Conference on Digital Image Computing Techniques and Applications (DICTA'11), Dec. 6, 2011 (Dec. 6, 2011), pp. 416-421, XP032094824, DOI: 10.1109/DICTA.2011.77.

Socher R., et al., "Reasoning with Neural Tensor Networks for Knowledge Base Completion," Proceedings of the 27th Annual Conference on Neural Information Processing Systems (NIPS'26), Dec. 5, 2013 (Dec. 5, 2013), pp. 926-935, XP055235569, ISBN: 978-1-63266-024-4.

Taiwan Search Report—TW104124589—TIPO—dated Apr. 10, 2019.

Tighe J., et al., "SuperParsing: Scalable Nonparametric Image Parsing with Superpixels", ECCV 2010, Springer-Verlag Berlin Heidelberg, Part V, LNCS 6315, 2010, pp. 352-365.

* cited by examiner

KNOWLEDGE-GRAPH BIASED CLASSIFICATION FOR DATA

CROSS-REFERENCE TO RELATED APPLICATION

This application claims the benefit under 35 U.S.C. § 119(e) to U.S. Provisional Patent Application No. 62/039,329 entitled "KNOWLEDGE-GRAPH BIASED CLASSIFICATION FOR DATA," filed on Aug. 19, 2014, the disclosure of which is expressly incorporated by reference herein in its entirety.

BACKGROUND

Field

Certain aspects of the present disclosure generally relate to neural system engineering and, more particularly, to knowledge-graph biased classification.

Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome. Depending on the complexity of the data and/or the network architecture, the neural network may not use the co-occurrences of patterns for object recognition. Thus, it is desirable to provide a neuromorphic receiver to classify objects in data based on knowledge-graph biasing.

SUMMARY

In one aspect of the present disclosure, a method for classifying an object is disclosed. The method includes applying multiple confidence values to multiple objects. The method also includes determiningH a metric based on the multiple confidence values. The method further includes determining a classification of a first object from the multiple objects based on a knowledge-graph when the metric is above a threshold.

Another aspect of the present disclosure is directed to an apparatus including means for applying multiple confidence values to multiple objects. The apparatus also includes means for determining a metric based on the multiple confidence values. The apparatus further includes means for determining a classification of a first object from the multiple objects based on a knowledge-graph when the metric is above a threshold.

In another aspect of the present disclosure, a computer program product for classifying an object is disclosed. The computer program product has a non-transitory computer-readable medium with non-transitory program code recorded thereon. The program code includes program code to apply multiple confidence values to multiple objects. The program code also includes program code to determine a metric based on the multiple confidence values. The program code further includes program code to determine a classification of a first object from the multiple objects based on a knowledge-graph when the metric is above a threshold.

Another aspect of the present disclosure is directed to an apparatus for classifying an object having a memory and one or more processors coupled to the memory. The processor(s) is configured to apply multiple confidence values to multiple objects. The processor(s) is also configured to determine a metric based on the multiple confidence values. The processor(s) is further configured to determine a classification of a first object from the multiple objects based on a knowledge-graph when the metric is above a threshold.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training And Operation

Figure 1:
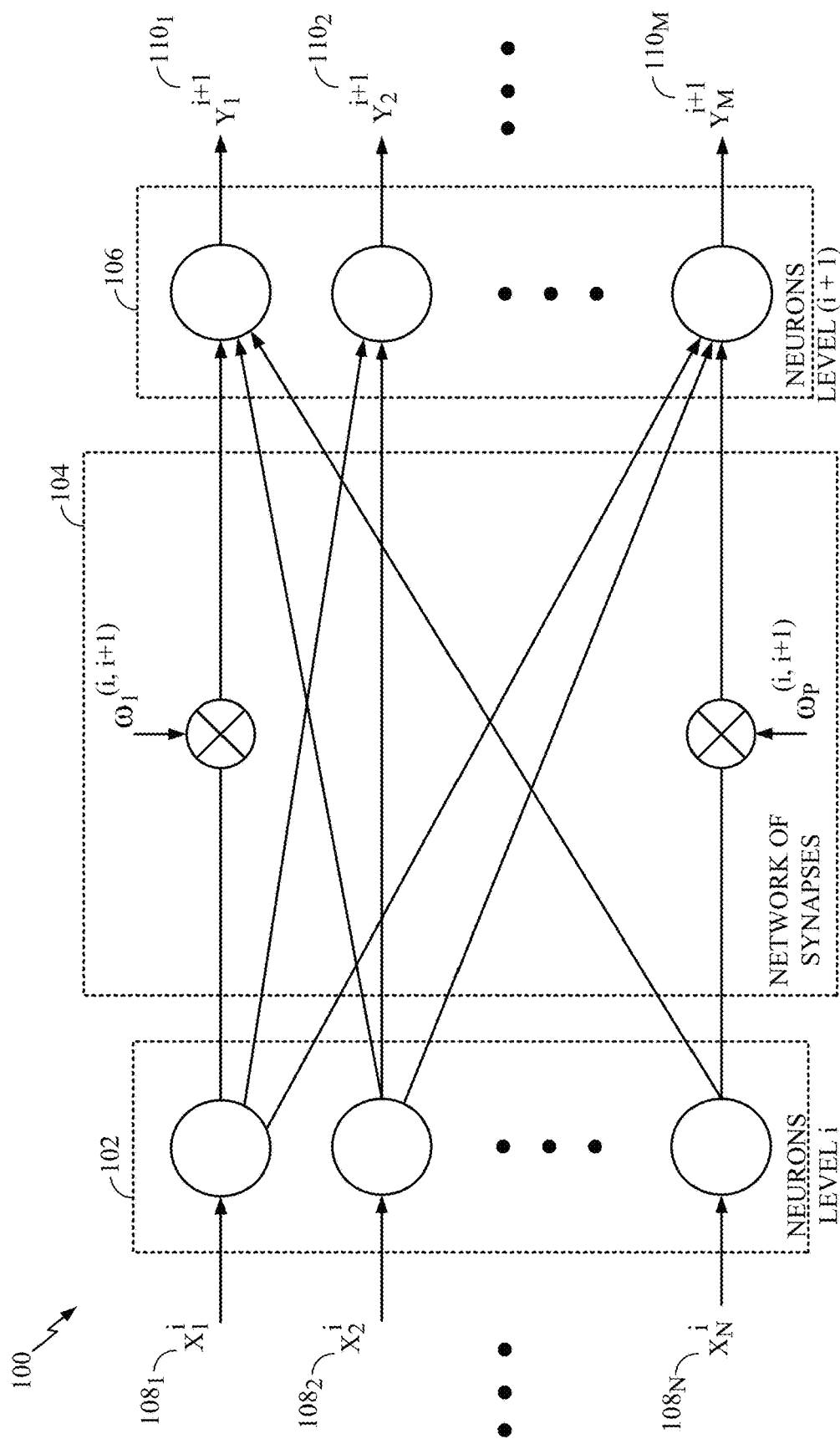
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons. This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
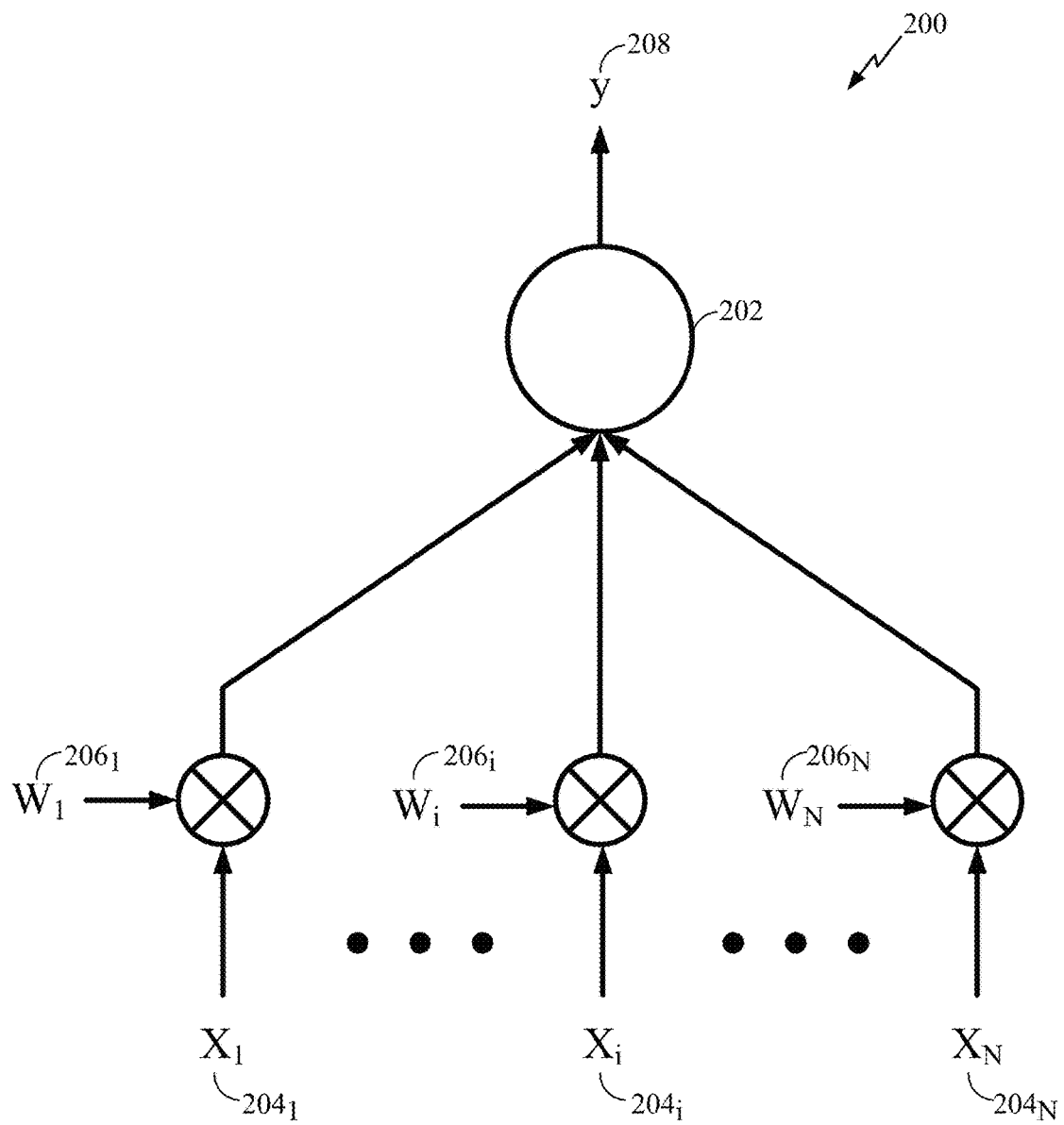
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not use plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t < 0 \end{cases} \quad (1)$$

where and $k_+$ and $k\_\tau_{sign(\Delta t)}$ are time constants for positive and negative time difference, respectively, $\alpha_-$ and $\alpha_-$ are corresponding scaling magnitudes, and $\mu$ is an offset that may be applied to the positive time difference and/or the negative time difference.

Figure 3:
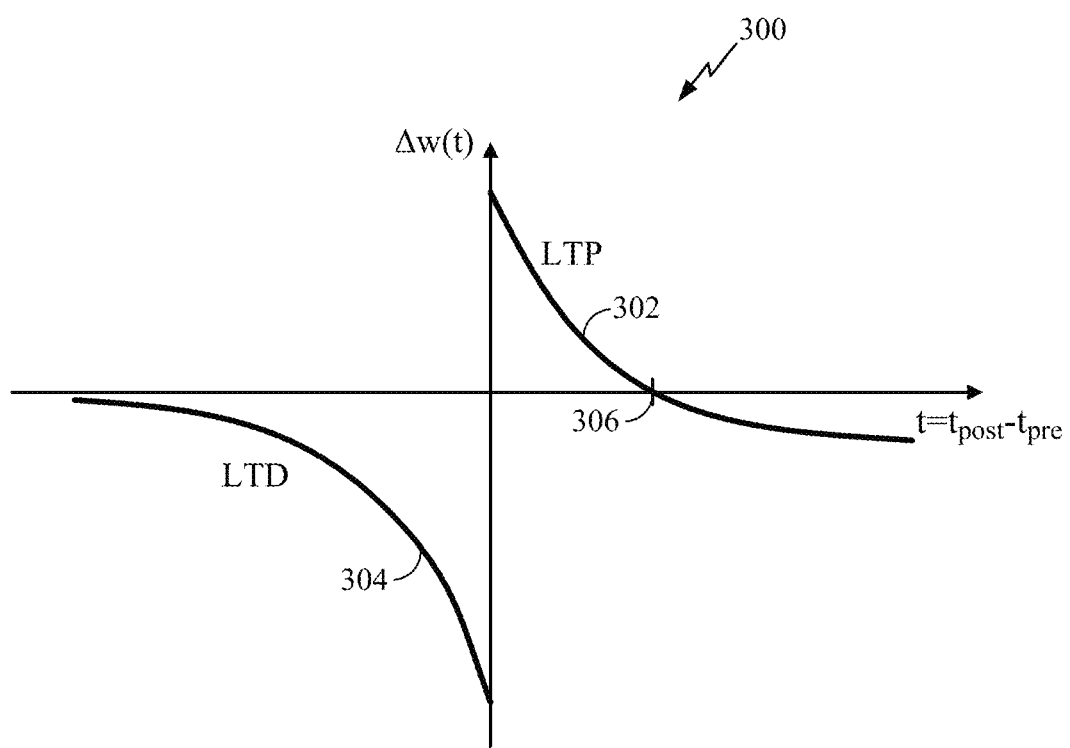
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset µ may be applied to the LTP (causal) portion 302 of the STDP graph. A point of cross-over 306 of the x-axis (y=0) may be configured to coincide with the maximum time lag for considering correlation for causal inputs from layer i-1. In the case of a frame-based input (i.e., an input that is in the form of a frame of a particular duration comprising spikes or pulses), the offset value µ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset µ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where α and β are parameters, $w_{m,n}$ is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u), \quad (4)$$

where v is a membrane potential, u is a membrane recovery variable, k is a parameter that describes time scale of the membrane potential v, α is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
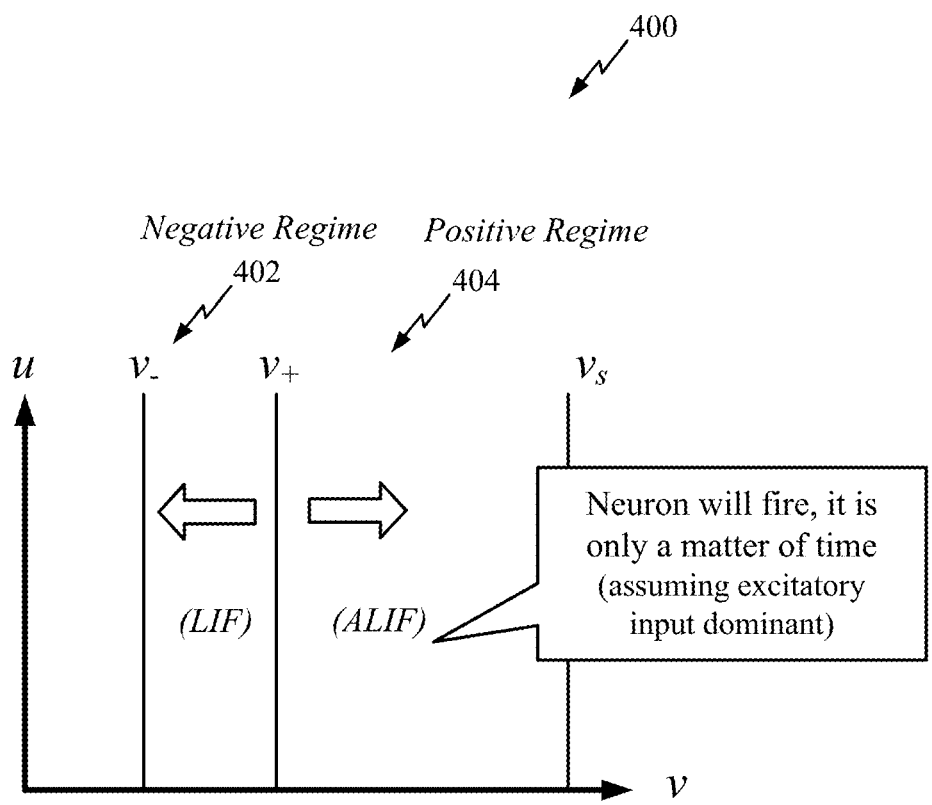
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

-continued $$-\tau_u \frac{du}{dt} = u + r, \quad (6)$$

where $q_\rho$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \varepsilon), \quad (8)$$

where δ, ε, β and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter β is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_s$. Subsequently, the state may be reset at a reset event (which may be one and the same as the spike event):

$$v = \hat{v}_- \quad (9)$$

$$u = u + \Delta u, \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r. \quad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho}. \tag{13}$$

If a spike is defined as occurring at the time the voltage state v reaches $v_s$, then the closed-form solution for the amount of time, or relative delay, until a spike occurs as measured from the time that the voltage is at a given state v is:

$$\Delta t_S = \begin{cases} \tau_+ \log \frac{v_S + q_+}{v + q_+} & \text{if } v > \hat{v}_+ \\ \infty & \text{otherwise} \end{cases} \tag{14}$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily utilize iterative methods or Numerical methods. An event-based implementation is also possible at a limited time resolution in a step-based simulator by only updating the model if an event occurs at or between steps or by "step-event" update.

Knowledge-Graph Biased Classification for Robustness to Severely Noisy Data

A conventional object recognition system includes an image preprocessing stage, a feature extraction stage, and a classification stage. Specifically, in the conventional object recognition system, the image preprocessing stage is specified to preprocess an image and segment features within the image.

In the present application, segmentation refers to determining boundaries around objects in an image. For example, an image may include a chair, a desk, and a lamp. Each of these objects may be segmented. The segment for each of the aforementioned objects may be, for example, the smallest rectangle that encloses all the pixels that belong to that object.

After preprocessing the image, a feature extraction stage extracts features from the preprocessed image. In the present application, the features may be referred to as objects, such as faces, monitors, keyboards, and/or other objects that may be photographed. Moreover, after extracting the features, the classifier may classify the extracted features. That is, the classification applies one or more possible classes to each extracted object. It should also be noted that in the present application, classes may be referred to as labels or categories. Additionally, or alternatively, the classifier is specified to classify the entire image or subsets of the image based on the extracted features. For example, the image may be classified as a sunset.

Figure 5:
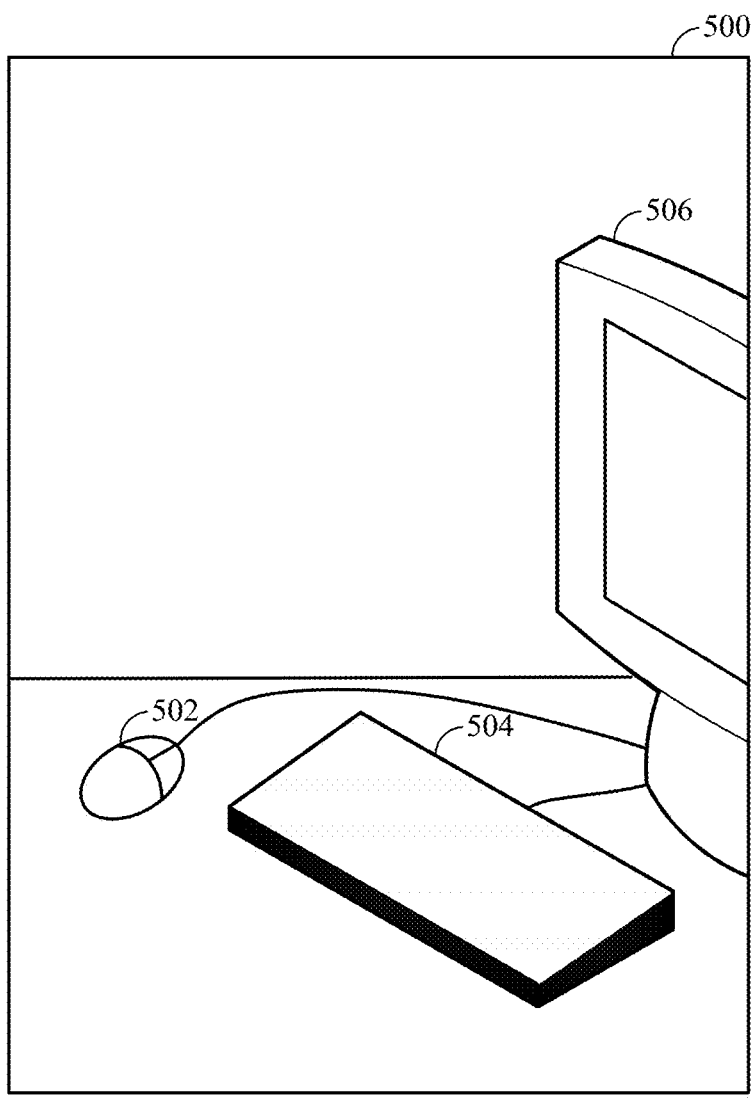
FIG. 5 illustrates an example of an image captured for processing by an object recognition system.

FIG. 5 illustrates an example of an image 500 that may be classified via an object recognition system. As shown in FIG. 5, the image 500 includes a PC monitor 506, a keyboard 504, and a mouse 502. Thus, based on the stages of the conventional object recognition system, the extracted objects are the PC monitor 506, the keyboard 504, and the mouse 502. As an example, the inferred classes for the extracted PC monitor object may be PC monitor, TV, and/or window. As another example, the inferred classes for the extracted keyboard object may be keyboard, tray, and placemat.

Furthermore, the classifier provides a confidence metric for one or more classes inferred from each object. The confidence metric may be based on training provided to the network. In the present application, the confidence metric may be referred to as the confidence, the confidence score, and/or the confidence value. In one example, an object extracted from the feature extractor may be a PC monitor and the classifier output for the PC monitor may be: PC monitor: 50%, TV: 40%, window: 10%. That is, the network has a 50% confidence that the object is a PC monitor, a 40% confidence that the object is a TV, and a 10% confidence that the object is a window. In this example, the PC monitor, TV, and window are classes inferred from an object extracted from an image.

Additionally, in one configuration, the difference between the highest confidence and the second highest confidence may be used as a confusion metric Specifically, in this configuration, a confusion metric, the confusion is reversely correlated to the difference between two confidence metrics. That is, a low difference between two confidence scores results in a high confusion. For example, in the previous example, the difference between the confidence metrics for the PC monitor (50%) and the TV (40%) is less than the difference between the difference between the confidence metrics for the PC monitor (50%) and the window (10%). Thus, in the previous example, there is a greater confusion as to whether the extracted object is a PC monitor or a TV in comparison to the confusion as to whether the extracted object is a PC monitor or a window.

In one configuration, for a given object, the confidences for each predicted class, in descending order, are P1, P2, . . . , Pk for k predictions. Additionally, or alternatively, the confusion metric may be determined as follows:

$$\text{Classifier confusion value} = P_1 - P_2 \tag{15}$$

$$\text{Classifier confusion value} = (P_1 - P_2)/(P_1 + P_2) \tag{16}$$

$$\text{Classifier confusion value} = P_1/\text{median}(P_1, P_2, \ldots, P_k) \tag{17}$$

$$\text{Classifier confusion value} = P_1/\text{mean}(P_1, P_2, \ldots, P_k) \tag{18}$$

In equations 15-18 the classifier confusion value is inversely correlated to the confusion. That is, a lower classifier confusion value may indicate a high confusion.

As previously discussed, the metrics may be based on training provided to the network. Thus, in some cases, a low confidence may be given to an object if the network has not been trained on the object. Additionally, or alternatively, the wrong class may receive the highest confidence score. In some cases, low image quality, occlusions, bad segmentation of the object, and/or other factors may cause a high confidence metric to be incorrectly assigned to a class. For example, as shown in FIG. 5, only a partial image of the PC monitor is captured. Thus, in the example of FIG. 5, the object recognition system may assign a higher confidence to a wrong class, such as window, in comparison to the confidence assigned to the correct class, such as PC monitor.

TABLE 1 provides an example of confidences assigned to classes inferred for objects extracted from an image. In this example, the confidence metrics of TABLE 1 may be based on the example of FIG. 5 in which the PC monitor 506 is partially shown in the image. As shown in TABLE 1, the classifier output for the monitor is: Window: 40%, Monitor: 35%, TV: 25%. That is, the network infers that the extracted PC monitor object is either a window, monitor, or TV. Furthermore, the network has a 40% confidence that the extracted PC monitor object is a window, 35% confidence that the extracted PC monitor object is a monitor, and a 25% confidence that the extracted PC monitor object is a TV.

TABLE 1

| True Object | Inference 1 | Inference 2 | Inference 3 |
| --- | --- | --- | --- |
| Monitor | Window - 40% | Monitor - 35% | TV - 25% |
| CPU | CPU - 80% | Box - 15% | Toaster - 5% |
| Mouse | Mouse - 90% | Insect - 10% | |
| Keyboard | Keyboard - 70% | Tray - 20% | Placemat - 10% |

For TABLE 1, the network has not considered the probability that the extracted PC monitor object is a PC monitor when there is a high degree of confidence that other three objects are a CPU (not shown in FIG. 5), a mouse, and a keyboard. Therefore, in the example of TABLE 1, the confidence that the object is a window is greater in comparison to the confidence that the object is a monitor.

In most cases, a human observer may accurately determine an object that is obstructed in an image based on the association of the object with un-obstructed objects of the image. For example, a human observer may recognize an obstructed monitor based on an association of monitors with un-obstructed objects, such as a CPU, a mouse, and/or a keyboard. The association knowledge is based on associative maps for objects that commonly occur with other objects.

Aspects of the present disclosure are directed to generating knowledge-graphs that indicate a probability of co-existence of different objects in an environment. Additionally, aspects of the present disclosure are also directed to biasing output of a classifier based on the knowledge-graph. Moreover, aspects of the present disclosure are further directed to updating an existing knowledge-graph based on the output of a classifier.

It should be noted that conventional systems may build Bayesian belief networks. For example, hierarchical databases may be built on knowledge-graphs derived from an English lexical dictionary. Moreover, other conventional systems improve classification results with prolonged use. Still, the conventional systems do not use a knowledge-graph based classification system that is dynamically-learned during training of the network.

Aspects of the present disclosure provide flexibility by decoupling a classifier from a parallel polling mechanism. Additionally, or alternatively, the parallel polling mechanism is coupled to the classifier to modify classifier weights based on the knowledge-graph output.

In one configuration, the knowledge-graph based classification system tags people (or objects) that are occluded and/or turned away from the camera. In some cases, a user may tend to take pictures with one or more individuals from a specific group, such as friends and/or family. Over time, the knowledge-graph associates the user with specific individuals. That is, the knowledge-graph biases the association with specific individuals based on pictures taken over time. Therefore, in one configuration, based on the association, a specific individual in a group image is tagged according to the knowledge-graph bias for the association of the specific individual with other individuals in the image. More specifically, the individual may be tagged even when the image of the individual is obstructed and/or noisy.

In another configuration, the knowledge-graph based classification system tags fast moving images captured via an image capturing device, such as a head-mounted display. Due to the nature of some image capturing devices, such as the head-mounted display, some captured images may be partially in view of the camera and/or may only be in view of the camera for a small time period. That is, some of the captured images may not be well framed.

Therefore, in this configuration, probable tags for objects that are partially in the view of the image capturing device and/or outside the view of the image capturing device are obtained by the knowledge-graph. It should be noted that the object not in the view of the image capturing device may be in a relative environment of the user. The knowledge-graph may be specified for the image capturing device to reduce the search space of possible object classes. Aspects of the present disclosure are not limited to head-mounted displays and are also contemplated for other image capturing devices.

In another configuration, the knowledge-graph based classification system suggests people to include in a photograph. Specifically, the knowledge-graph may build graphs of groups of people that commonly appear in captured images. Thus, in one configuration, while framing a group photo, the knowledge-graph provides contextual information for other individuals that should be included in the photo based on the knowledge-graph information.

In some cases, certain classes may not be identified by the classifier. Therefore, in one configuration, the knowledge-graph based classification system presents a list of possible classes in an object-tagging application. That is, the knowledge-graph may aid the user to apply the correct class to an extracted object. For example, in a face tagging application, one or more faces may have a low confidence or may not be segmented. Thus, in this example, the knowledge-graph provides a list of possible names that the user can associate with a specific individual. Moreover, the classifier may be trained from the user-tagged images and/or the knowledge-graph may be updated based on the user-tagged images.

Figure 6:
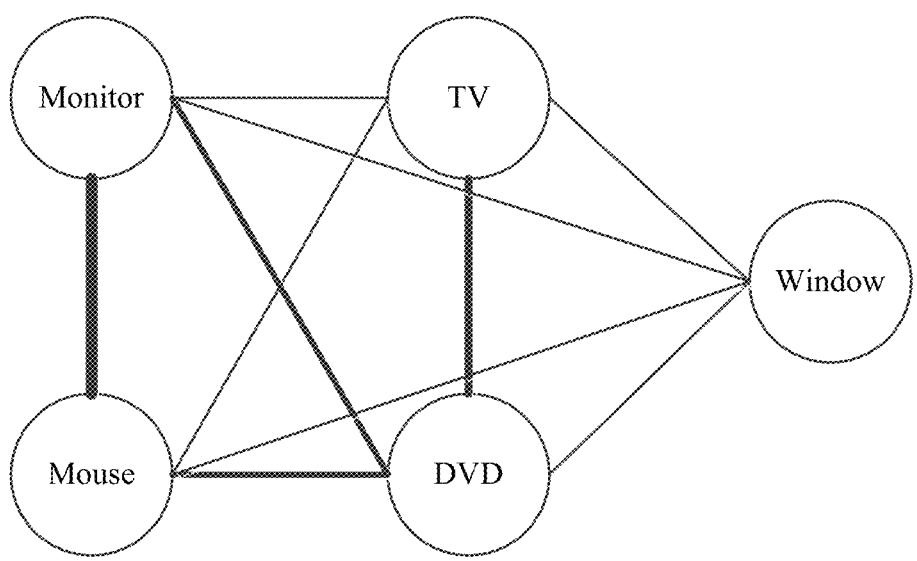
FIG. 6 illustrates an example of a knowledge-graph according to an aspect of the present disclosure.

FIG. 6 illustrates an example of a knowledge-graph based on an aspect of the present disclosure. As shown in FIG. 6, each object is associated with another object. In this example, as shown in FIG. 6, the thicker lines represent stronger probabilities of co-existence. For example, as shown in FIG. 6, the monitor has a stronger probability of co-existing with a mouse in comparison to the probability of co-existing with a window. In another example, as shown in FIG. 6, the DVD has a stronger probability of co-existing with the TV in comparison to the probability of co-existing with the window.

In one configuration, the knowledge-graph is represented as a matrix of pair-wise occurrence probabilities. For example, the knowledge-graph of FIG. 6 may be coded as the knowledge-graph matrix (KGM) of TABLE 2.

TABLE 2

|  | Monitor | TV | Window | DVD | Mouse |
|---|---|---|---|---|---|
| Monitor | 1 | 0 | 0.2 | 0.4 | 0.9 |
| TV | 0 | 1 | 0.6 | 0.9 | 0.7 |
| Window | 0.2 | 0.6 | 1 | 0.6 | 0 |
| DVD | 0.4 | 0.9 | 0.6 | 1 | 0 |
| Mouse | 0.9 | 0.7 | 0 | 0 | 1 |

As shown in TABLE 2, each intersection of a column and row represents the occurrence probability of two objects. For example, as shown in TABLE 2, the monitor has a zero probability of occurring with a TV, a 0.2 probability of occurring with the window, a 0.4 probability of occurring with the DVD, and a 0.9 probability of occurring with the mouse.

The pseudo-code provided below is an example for generating the knowledge-graph from an initial database without external input. That is, the knowledge-graph may be trained based on acquired images. In the present example, $A_i$ refers to images, $L_1 \ldots L_N$ refer to classes or objects, and F refers to refers to the amount of increment for a given matrix location defined by $(L_i, L_j)$. In one configuration, F is a constant scalar value
Initialize all elements of the knowledge-graph matrix (KGM)
For each {image in database, $A_i$}
  Get label indices of objects: $L_1, L_2, \ldots, L_N$
  Increment matrix entries $(L_i, L_j)$, {0<i, j<=N} by F In this configuration, it is assumed that each image is annotated in terms of the classes. Furthermore, it is assumed that each class has a unique index. For example, a class, such as car, has an index of 7 and another class, such as traffic light, has an index of 31. Thus, the matrix elements (7, 31) and (31, 7) for the two classes include the probability of co-existence of the two classes, such as the car and traffic light. The co-existence may also be referred to as co-occurrence and vice versa.

It should be noted that aspects of the present disclosure assume a non-directed graph, resulting in a symmetric knowledge-graph matrix. Still, aspects of the present disclosure are also contemplated for a temporal sequence. That is, in some cases, such as speech/audio date having n-tuple models, the order of appearance is used for determining a co-existence probability. In another configuration, the dimensionality of the knowledge-graph matrix is greater than two so that the dimensions capture co-occurrence statistics for more than two objects at a time and/or associates other environmental factors, such as GPS location and/or time of day, to the co-occurrence statistics of multiple objects.

Based on the previous example, the matrix element (7, 31) may indicate the probability of one object, such as a car, being followed by another object, such as a traffic light, in one or more images, such as a video. Additionally, the matrix element (31, 7) may indicate the probability of one object, such as the traffic light, being followed by another object, such as the car, in one or more images, such as a video. In the present example of a directed graph, a third dimension may be added to indicate a time between co-occurrences. For example, a matrix element (7, 31, 10) may indicate the probability of a car followed by a traffic light within ten time units of each other in a video segment. The time units may be seconds, minutes, hours, or any other unit of time.

In the present example, a parallel scoring system is specified for a given class. That is, when an object is presented to the system, confidence metrics $P_1, P_2, \ldots P_k$ for the top k predicted classes are specified for the object. For example, as previously discussed, in TABLE 1, a metric, such as the confidence metric, for the monitor object may be 40% ($P_1$), 35% ($P_2$), and 25% ($P_3$).

In one configuration, the system determines the object with the greatest confidence metric $P_1$. For example, based on TABLE 1, the mouse has the greatest confidence metric (90%). Furthermore, for each object in the image, such as the mouse, CPU, keyboard, and monitor, the system determines a metric. In one configuration, the system determines a confusion metric based on a difference of the confidences of the classes. A confusion metric may be based on the following equation:

$$\text{Classifier confusion value} = 1/(P_1 - P_2) \quad (19)$$

As shown in TABLE 1, the system has a 40% confidence that the monitor is a window and a 35% confidence that the monitor is a monitor. Therefore, based on equation 15, the confusion metric is 20%. That is the confusion metric is the quotient of the difference between two confidence metrics divided by a numerator having a value of 1.

In this configuration, a high confusion metric indications that confusion exists as to whether a true object is one of two inferred classes. Thus, for an object in the image, if the confusion metric is less than a threshold, the predicted class is accepted as the correct class. Moreover, if the confusion metric for an object is greater than the threshold, the system determines the probability that binds predicted classes for object to the class with the highest confidence.

In the present example, the threshold may be 10%. Therefore, for TABLE 1, because the classifier confusion for the monitor is 20%, the system does not accept the predicted class having the highest confidence value, such as the window, as the correct class. Thus, the system determines the probability that binds predicted classes for an object, such as the monitor, to the object with the highest confidence $P_1$, such as the mouse.

The bindings may be based on the knowledge-graph matrix probabilities $W_1, W_2, \ldots W_k$ of TABLE 2. After determining the knowledge-graph matrix probabilities, a weighted confidence is determined based on a product of the confidence metrics $P_1, P_2, \ldots P_k$ of the object and the knowledge-graph matrix probabilities $W_1, W_2, \ldots W_k$. Finally, the weighted confidence metrics of the predicted classes for an object are used to select the predicted class having the highest weighted confidence.

In the present example, based on TABLE 2, when the object with the highest confidence is a mouse, the weight ($W_1$) for the window is 0 and the weight ($W_2$) for the monitor is 0.9. The knowledge-graph matrix from TABLE 2 determines the weighted confidence score of the classes for the monitor. For example, for the monitor, the weighted confidence of the window class is the product of the original confidence $P_1$ (40%) and the weight $W_1$ (0). Additionally, the weighted confidence of the monitor class is the product of the original confidence $P_2$ (35%) and the weight $W_2$ (0.9). The weighted confidences based on TABLE 1 and TABLE 2 are shown in TABLE 3.

TABLE 3

| True Object | Inference 1 | Inference 2 | Inference 3 |
|---|---|---|---|
| Monitor | Window - 0% | Monitor - 32% | TV - 17% |

In this example, the confidence for the window, monitor and TV are weighted with the knowledge-graph matrix probabilities linking the mouse to the window, the mouse to the monitor, and the mouse to the TV. Based on the new confidence scores, the monitor is now considered the winning class because the monitor has the highest weighted confidence.

That is, the output of the classifier is biased based on the weights provided in the knowledge-graph matrix. For example, as shown in TABLE 2, it is more likely for a mouse to co-exist with a monitor, rather than co-existing with either a TV or a window. Therefore, the mouse/monitor relationship is given a greater weight in comparison to the mouse/window relationship and the mouse/TV relationship. The weights provided in the knowledge-graph matrix may be based on the training of the system.

In one configuration, the output of the deep convolutional network (DCN) classifier also augments the knowledge-graph matrix. In this configuration, based on the output of the classifier, the system selects all objects with a confusion that is less than a threshold and builds the knowledge-graph matrix from the selected objects.

For example, TABLE 1 indicates that CPU, mouse, and keyboard have low confusion metrics. Therefore, the entries, such as CPU, mouse, and keyboard, may increment the entries in the knowledge-graph matrix by linking the object labels in a pairwise form. The increment amount may be fixed or may be a function of the amount of confusion for the pairwise participant class labels. That is, the objects with a confusion that is below the threshold may update the weights of the knowledge-graph matrix. That is, the system may be trained by updating the weights of the knowledge-graph matrix.

Alternatively, or in addition, a user may correct a class assigned to an object when the inference is incorrect. In this configuration, the correct class is assigned a confidence of 100% and the corresponding entries in the knowledge-graph matrix that link the class of the corrected object to other objects are incremented. In another configuration, the knowledge-graph matrix is updated with negative correlations, such as leaky updates.

Leaky updates specify a decay for each element of the knowledge-graph matrix over time in consideration of the loss of associativity over time. For example, if a person does not associate with members of a certain group of friends, the knowledge-graph matrix will reflect the loss of association over time by reducing the corresponding entries in the knowledge-graph matrix.

As previously discussed, spatial correlations may also be used for multiple dimensional knowledge-graph matrices. In one aspect, another dimension, such as a third or fourth dimension, may be specified to indicate the spatial separation of objects. For example, element (7, 31, 10) may indicate the probability of co-occurrence of a car and a traffic light within ten distance units of each other. The distance units may be feet, inches, meters, or any other measurement unit.

Thus, based on aspects of the present disclosure, the knowledge-graph matrix uses an initial dataset and also adapts to future images based on the probability of co-occurrence of different object classes. In one configuration, the spatial and/or temporal relations of objects are considered when objects are labeled for confidence. Moreover, aspects of the present disclosure may also be applied to speech and/or video. For example, video frames may be repopulated based on contents of a previous frame.

In one configuration, the feature extraction is implemented as a deep convolutional network. In this configuration, an integrated deep convolutional network knowledge-graph matrix is specified by connecting all nodes in the top layer of the deep convolutional network with plastic synapses. That is, each node represents a class and the activation of that node is the probability of a certain class. When the knowledge-graph is learned, synapses between co-occurring objects' nodes are strengthened and synapses between non-co-occurring objects' nodes are weakened. The lateral synapses add input to an object's node based on the other activated object nodes. Specifically, the knowledge-graph matrix is implemented via lateral connections in the output layer of the deep convolutional network. The plasticity of the synapses allows the user to update the knowledge-graph matrix or new object co-occurrences to be learned over time. In one configuration, two separate sets of synapses are provided, one for the knowledge-graph matrix and one for the classifier.

Aspects of the present disclosure improve performance of a classification network in the presence of noise, reduce latency of classification by pre-fetching possible output classes and reducing the search-space, and enable novel user-experiences.

Figure 7:
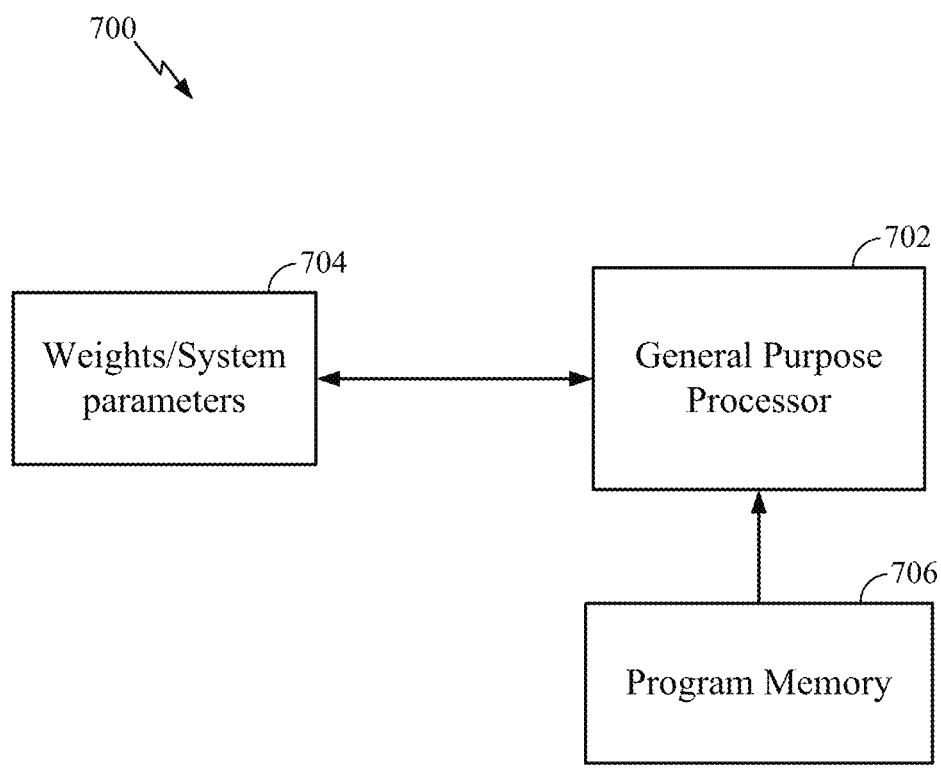
FIG. 7 illustrates an example implementation of designing a neural network using a general-purpose processor in accordance with certain aspects of the present disclosure.

FIG. 7 illustrates an example implementation 700 of the aforementioned object classification based on knowledge-graph association using a general-purpose processor 702 in accordance with certain aspects of the present disclosure. Variables (neural signals), synaptic weights, system parameters associated with a computational network (neural network), delays, and frequency bin information may be stored in a memory block 704, while instructions executed at the general-purpose processor 702 may be loaded from a program memory 706. In an aspect of the present disclosure, the instructions loaded into the general-purpose processor 702 may comprise code for building a knowledge-graph that computes pair-wise probabilities of co-occurrence of different object classes, using the knowledge-graph to augment the performance of an object classification system in the presence of noise, and/or adapting the knowledge-graph with new data from the output of the classifier or from user generated tags.

Figure 8:
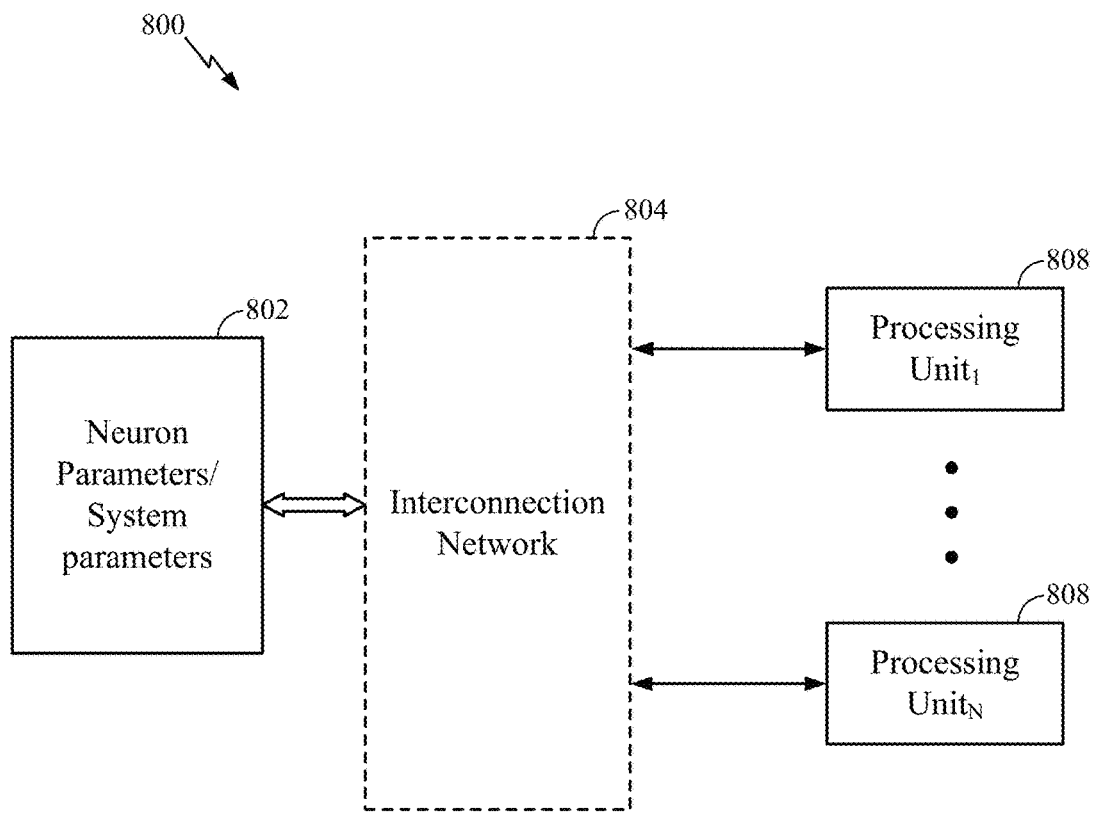
FIG. 8 illustrates an example implementation of designing a neural network where a memory may be interfaced with individual distributed processing units in accordance with certain aspects of the present disclosure.

FIG. 8 illustrates an example implementation 800 of the aforementioned object classification based on knowledge-graph association where a memory 802 can be interfaced via an interconnection network 804 with individual (distributed) processing units (neural processors) 808 of a computational network (neural network) in accordance with certain aspects of the present disclosure. Variables (neural signals), synaptic weights, system parameters associated with the computational network (neural network) delays, frequency bin information, knowledge-graph associations may be stored in the memory 802, and may be loaded from the memory 802 via connection(s) of the interconnection network 804 into each processing unit (neural processor) 808. In an aspect of the present disclosure, the processing unit 808 may be configured to build a knowledge-graph that computes pair-wise probabilities of co-occurrence of different object classes, use the knowledge-graph to augment the performance of an object classification system in the presence of noise, and/or adapt the knowledge-graph with new data from the output of the classifier or from user generated tags.

Figure 9:
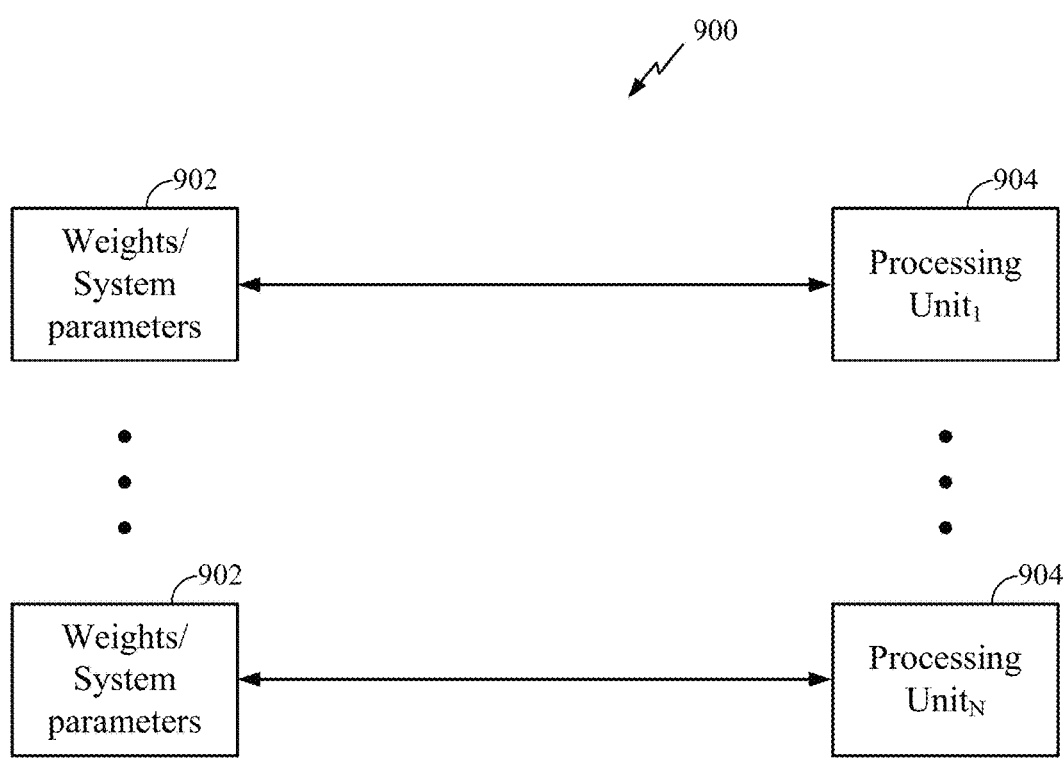
FIG. 9 illustrates an example implementation of designing a neural network based on distributed memories and distributed processing units in accordance with certain aspects of the present disclosure.

FIG. 9 illustrates an example implementation 900 of the aforementioned object classification based on knowledge-graph association. As illustrated in FIG. 9, one memory bank 902 may be directly interfaced with one processing unit 904 of a computational network (neural network). Each memory bank 902 may store variables (neural signals), synaptic weights, and/or system parameters associated with a corresponding processing unit (neural processor) 904 delays, frequency bin information, and knowledge-graph associations. In an aspect of the present disclosure, the processing unit 904 may be configured to build a knowledge-graph that computes pair-wise probabilities of co-occurrence of different object classes, to use the knowledge-graph to augment the performance of an object classification system in the presence of noise, and/or to adapt the knowledge-graph with new data from the output of the classifier or from user generated tags.

Figure 10:
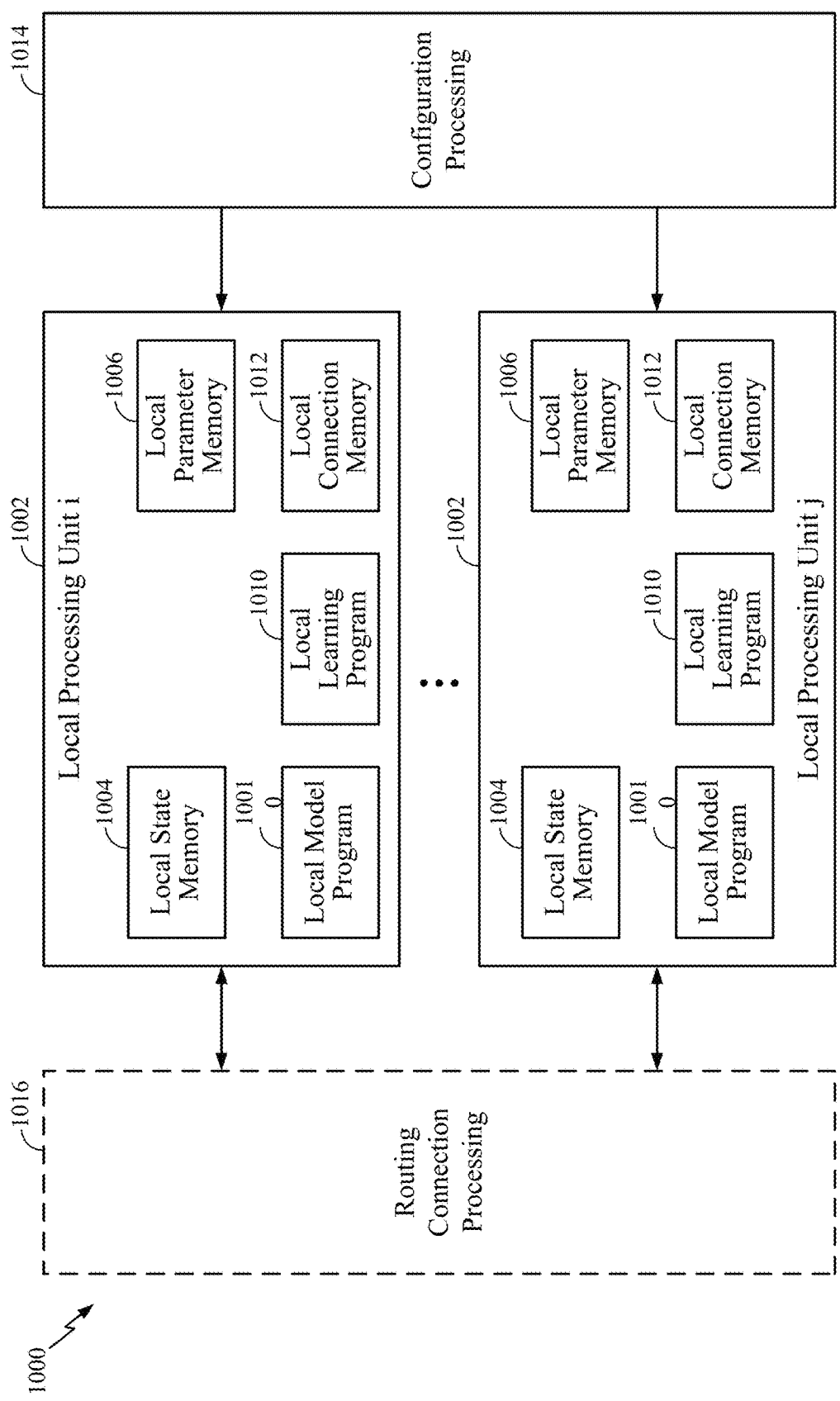
FIG. 10 illustrates an example implementation of a neural network in accordance with certain aspects of the present disclosure.

FIG. 10 illustrates an example implementation of a neural network 1000 in accordance with certain aspects of the present disclosure. As illustrated in FIG. 10, the neural network 1000 may have multiple local processing units 1002 that may perform various operations of methods described above. Each local processing unit 1002 may comprise a local state memory 1004 and a local parameter memory 1006 that store parameters of the neural network. In addition, the local processing unit 1002 may have a local (neuron) model program (LMP) memory 1010 for storing a local model program, a local learning program (LLP) memory 1010 for storing a local learning program, and a local connection memory 1012. Furthermore, as illustrated in FIG. 10, each local processing unit 1002 may be interfaced with a configuration processor unit 1014 for providing configurations for local memories of the local processing unit, and with a routing connection processing unit 1016 that provide routing between the local processing units 1002.

In one configuration, a neuron model is configured for classifying an object based on a knowledge-graph association. The neuron model includes an applying means, and a determining means. In one aspect, the applying means, and/or determining means may be the general-purpose processor 702, program memory 706, memory block 704, memory 802, interconnection network 804, processing units 808, processing unit 904, local processing units 1002, and or the routing connection processing units 1016 configured to perform the functions recited. In another configuration, the aforementioned means may be any module or any apparatus configured to perform the functions recited by the aforementioned means.

According to certain aspects of the present disclosure, each local processing unit 1002 may be configured to determine parameters of the neural network based upon desired one or more functional features of the neural network, and develop the one or more functional features towards the desired functional features as the determined parameters are further adapted, tuned and updated.

Figure 11:
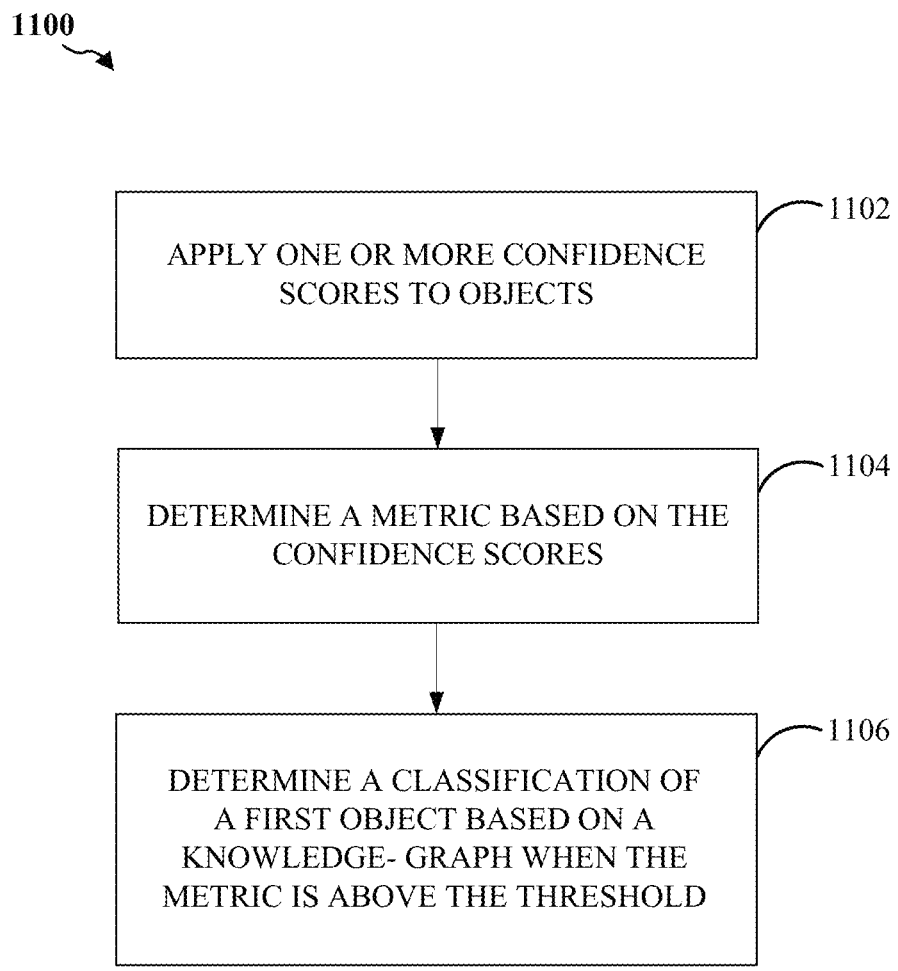
FIG. 11 is a flow diagram illustrating a method for classifying an object in accordance with an aspect of the present disclosure.

FIG. 11 illustrates a method 1100 for classifying objects. In block 1102, an object classifier applies one or more confidence scores to objects. That is, each object is associated with one or more confidence scores. Furthermore, in block 1104, the object classifier determines a metric based on the confidence scores. Finally, in block 1106, the object classifier determines a classification of a first object based on a knowledge-graph when the metric is above the threshold.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for computer-implemented tagging of objects in an image, the method comprising:
    processing the image by a computer-implemented artificial neural network to identify at least a first and a second object and generate, for at least the first object, at least a first and a second predicted classification and corresponding confidence values, the first object being partially visible in the image;
    generating an adjusted first confidence value by adjusting the confidence value corresponding to the first predicted classification based on a predetermined co-existence probability for the first predicted classification and the second object and also at least one of a physical location of an image capturing device or a time when the image was captured;
    generating an adjusted second confidence value by adjusting the confidence value corresponding to the second predicted classification based on a predetermined co-existence probability for the second predicted classification and the second object and also at least one of the physical location of the image capturing device or the time when the image was captured;
    determining a classification for the first object based on the first and second predicted classifications and the corresponding adjusted first and second confidence values; and
    generating a tag for the first object using the determined classification.

2. The method of claim 1, wherein the predetermined co-existence probabilities are obtained from a knowledge-graph matrix.

3. The method of claim 2, further comprising updating the knowledge-graph matrix based on the classification of the first object.

4. The method of claim 3, wherein the updating is based on user input.

5. The method of claim 1, further comprising calculating a classifier confusion value based on a difference between the confidence values corresponding to the first and second predicted classifications.

6. The method of claim 5, wherein the steps of generating adjusted confidence values are performed only if the classifier confusion value is greater than a threshold.

7. The method of claim 1, wherein the image is a frame of a video stream.

8. A computer apparatus comprising a memory and a processor coupled to the memory, wherein the processor is adapted to:
    process an image by a computer-implemented artificial neural network to identify at least a first and a second object and generate, for at least the first object, at least a first and a second predicted classification and corresponding confidence values, the first object being partially visible in the image;
    generate an adjusted first confidence value by adjusting the confidence value corresponding to the first predicted classification based on a predetermined co-existence probability for the first predicted classification and the second object and also at least one of a physical location of an image capturing device or a time when the image was captured;
    generate an adjusted second confidence value by adjusting the confidence value corresponding to the second predicted classification based on a predetermined co-existence probability for the second predicted classification and the second object and also at least one of the physical location of the image capturing device or the time when the image was captured;
    determine a classification for the first object based on the first and second predicted classifications and the corresponding adjusted first and second confidence values; and
    generate a tag for the first object using the determined classification.

9. The apparatus of claim 8, wherein the predetermined co-existence probabilities are obtained from a knowledge-graph matrix.

10. The apparatus of claim 9, wherein the processor is further adapted to update the knowledge-graph matrix based on the classification of the first object.

11. The apparatus of claim 10, wherein the updating is based on user input.

12. The apparatus of claim 8, wherein the processor is further adapted to calculate a classifier confusion value based on a difference between the confidence values corresponding to the first and second predicted classifications.

13. The apparatus of claim 12, wherein the processor is adapted to generate the adjusted confidence values only if the classifier confusion value is greater than a threshold.

14. The apparatus of claim 8, wherein the image is a frame of a video stream.

15. A non-transitory computer-readable medium having program code recorded thereon for computer-implemented tagging of objects in an image, the program code being executed by a processor and comprising:
    program code to process the image by a computer-implemented artificial neural network to identify at least a first and a second object and generate, for at least the first object, at least a first and a second predicted classification and corresponding confidence values, the first object being partially visible in the image;
    program code to generate an adjusted first confidence value by adjusting the confidence value corresponding to the first predicted classification based on a predetermined co-existence probability for the first predicted classification and the second object and also at least one of a physical location of an image capturing device or a time when the image was captured;
    program code to generate an adjusted second confidence value by adjusting the confidence value corresponding to the second predicted classification based on a predetermined co-existence probability for the second predicted classification and the second object and also at least one of the physical location of the image capturing device or the time when the image was captured;

program code to determine a classification for the first object based on the first and second predicted classifications and the corresponding adjusted first and second confidence values; and program code to generate a tag for the first object using the determined classification.

* * * * *